United States Patent
Chae

(10) Patent No.: US 7,196,748 B2
(45) Date of Patent: Mar. 27, 2007

(54) IN-PLANE SWITCHING MODE LIQUID CRYSTAL DISPLAY DEVICE AND METHOD FOR MANUFACTURING THE SAME

(75) Inventor: Gee Sung Chae, Incheon-Kwangyokshi (KR)

(73) Assignee: LG.Philips LCD Co., Ltd, Seoul (KR)

( * ) Notice: Subject to any disclaimer, the term of this patent is extended or adjusted under 35 U.S.C. 154(b) by 0 days.

(21) Appl. No.: 10/020,891

(22) Filed: Dec. 19, 2001

(65) Prior Publication Data

US 2002/0080293 A1  Jun. 27, 2002

(30) Foreign Application Priority Data

Dec. 26, 2000  (KR) ................ 2000-81949

(51) Int. Cl.
*G02F 1/1343* (2006.01)
(52) U.S. Cl. .............. 349/43; 349/141; 349/187
(58) Field of Classification Search ......... 349/141, 349/143, 42, 43, 139, 147, 148, 187, 192
See application file for complete search history.

(56) References Cited

U.S. PATENT DOCUMENTS

| 5,598,285 | A |   | 1/1997  | Kondo et al. ............ 349/39 |
| 5,838,037 | A |   | 11/1998 | Masutani et al. ......... 257/296 |
| 5,946,060 | A |   | 8/1999  | Nishiki et al. ........... 349/48 |
| 5,990,986 | A | * | 11/1999 | Song et al. ............... 349/43 |
| 5,990,987 | A |   | 11/1999 | Tanaka .................... 349/43 |
| 5,995,187 | A | * | 11/1999 | Wakagi et al. ............ 349/141 |
| 6,028,653 | A |   | 2/2000  | Nishida .................... 349/141 |
| 6,069,019 | A | * | 5/2000  | Ishii et al. ............... 438/30 |
| 6,097,454 | A |   | 8/2000  | Zhang et al. ............. 349/43 |
| 6,177,970 | B1 | * | 1/2001 | Kim ........................ 349/43 |
| 6,281,957 | B1 | * | 8/2001 | Oh et al. .................. 349/141 |
| 6,445,428 | B1 | * | 9/2002 | Fujikawa et al. ........ 349/43 |
| 6,529,251 | B2 | * | 3/2003 | Hibino et al. ............ 349/42 |
| 6,577,368 | B1 | * | 6/2003 | Yuh et al. ................ 349/141 |
| 6,649,934 | B2 | * | 11/2003 | Song et al. .............. 257/59 |

FOREIGN PATENT DOCUMENTS

| JP | 09-005764 | 1/1997 |
| JP | 09-073101 | 3/1997 |
| JP | 09-101538 | 4/1997 |
| JP | 09-105908 | 4/1997 |

(Continued)

OTHER PUBLICATIONS

R. Kiefer et al. "In-Plane Switching of Nematic Liquid Crystals." *Japan Display*. 1992. pp. 547-550.

(Continued)

*Primary Examiner*—Dung T. Nguyen
*Assistant Examiner*—Thoi V. Duong
(74) *Attorney, Agent, or Firm*—McKenna Long & Aldridge LLP

(57) ABSTRACT

An in-plane switching mode LCD device and a method for manufacturing the same are disclosed, which are applicable to LCD device having a wide viewing angle, fineness and a wide size by using low resistance materials as source and drain electrode. A buffer layer is formed on an ohmic contact layer in the in-plane switching mode LCD.

24 Claims, 6 Drawing Sheets

FOREIGN PATENT DOCUMENTS

KR  102000257370  2/2000
KR  1020002072537  8/2000

OTHER PUBLICATIONS

M. Oh-e et al. "Principles and Characteristics of Electro-Optical Behaviour with In-Plane Switching Mode." *Asia Display.* 1995. pp. 577-580.

M. Ohta et al. "Development of Super-TFT-LCDs with In-Plane Switching Display Mode." *Asia Display.* 1995. pp. 707-710.

S. Matsumoto et al. "Display Characteristics of In-Plane Switching (IPS) LCDs and a Wide-Viewing-Angle 14.5-in. IPS TFT-LCD." *Euro Display.* 1996. pp. 445-448.

H. Wakemoto et al. "An Advanced In-Plane Switching Mode TFT-LCD." *SID Digest* 1997. pp. 929-932.

S. H. Lee et al. "High Transmittance, Wide-Viewing-Angle Nematic Liquid Crystal Display Controlled by Fringe-Field Switching." *Asia Display.* 1998. pp. 371-374.

* cited by examiner

IN-PLANE SWITCHING MODE LIQUID CRYSTAL DISPLAY DEVICE AND METHOD FOR MANUFACTURING THE SAME

This application claims the benefit of Korean Patent Application No. 2000-81949, filed on Dec. 26, 2000, the entirety of which is hereby incorporated by reference for all purposes as if fully set forth herein.

BACKGROUND OF THE INVENTION

1. Field of the Invention

The present invention relates to a display device, and more particularly, to an in-plane switching mode liquid crystal display (LCD) device and a method for manufacturing the same.

2. Background of the Related Art

An in-plane switching mode LCD device is an LCD device having a wide viewing angle, which has been developed for solving a problem of having a narrow viewing angle in a Twisted Nematic LCD device. In the in-plane switching mode LCD device, common and pixel electrodes are formed on one substrate, and liquid crystals are driven by a horizontal electric field generated between the common and pixel electrodes, so that a viewing angle in the in-plane switching mode LCD device is wider than a viewing angle in the Twisted Nematic LCD device.

A related art LCD device structure and a method for manufacturing the same will be described with reference to the accompanying drawings.

FIG. 1A is a structural plan view illustrating a structure of the related art in-plane switching mode LCD device. FIG. 1B is a plan view taken along line I–I' of FIG. 1A.

As shown in FIG. 1A, the related art in-plane switching mode LCD device includes gate line 211 and data line 212 arranged on an insulating substrate (not shown) to define a pixel region, a common line 213 arranged within the pixel region in parallel with the gate line 211, a thin film transistor formed at a crossing point between the gate line 211 and the data line 212, a pixel electrode 208 arranged within the pixel region in parallel with the data line 212 and connected with a drain electrode of the thin film transistor, and a common electrode 210 arranged within the pixel region in parallel with the data line 212 and extending from the common line 213.

The thin film transistor will be described in detail with reference to FIG. 1B. A gate electrode 202 is formed on an insulating substrate 201, and a gate insulating film 203 is formed on the surface of the insulating substrate 201 including the gate electrode 202. Then, a semiconductor layer 204 is formed like an island on the gate insulating film 203 above the gate electrode 202, and an ohmic contact layer 205 is formed on both sides of the gate electrode 202 on the semiconductor layer 204. Source electrode 206 and drain electrode 207 are formed at both sides of the gate electrode 202 above the semiconductor layer 204. An ohmic contact layer 205 is formed between the source and drain electrodes 206 and 207 and the semiconductor layer 204. A pixel electrode 208 is formed on the drain electrode 207 and the gate insulating film 203. A passivation film 209 is deposited on the gate insulating film on which the pixel electrode 208 is formed, and a common electrode 210 is formed on the passivation film 209.

Generally, in the related art LCD device shown in FIG. 1B, the gate insulating film 203 and the passivation film 209 may consist of a silicon nitride film ($SiN_x$). The gate electrode 202 may consist of conductive materials such as copper (Cu), titanium (Ti), and chromium (Cr). The source electrode 206 and the drain electrode 207 may consist of chromium (Cr) in taking into consideration of the etching selectivity with a transparent electrode.

A method for manufacturing the related art in-plane switching mode LCD device will now be described with reference to FIG. 2A to FIG. 2E.

FIG. 2A to FIG. 2E are plan views illustrating process steps for manufacturing the related art in-plane switching mode LCD device.

As shown in FIG. 2A, gate line materials and conductive metal materials, are deposited on the insulating substrate 201 by a process such as sputtering. Then, the gate electrode 202 is formed by a patterning process such as photolithography. The gate insulating film 203 consisting of a silicon oxide film or a silicon nitride film, the semiconductor layer 204 of amorphous silicon, and the ohmic contact layer 205 of amorphous silicon containing n-type dopant, are deposited by a process such as plasma enhanced chemical vapor deposition (PECVD).

As shown in FIG. 2B, the semiconductor layer 204 and the ohmic contact layer 205 formed on the gate insulating film 203, are selectively patterned.

As shown in FIG. 2C, a data line material, a conductive metal material such as chromium (Cr), is deposited on the ohmic contact layer 205 by a sputtering process, and the source electrode 206 and the drain electrode 207 are formed by a patterning process such as photolithography, so that the thin film transistor is formed.

As shown in FIG. 2D, the pixel electrode 208 is formed on the drain electrode 207.

As shown in FIG. 2E, the passivation film 209 is deposited on the substrate, on which the above layers are deposited, by a plasma enhanced chemical vapor deposition (PECVD) process. The transparent common electrode 210 is formed on the passivation layer 209 using a conductive material such as indium tin oxide (ITO). Therefore, the manufacturing process steps of the related art LCD device are completed.

However, there are following problems in the related art in-plane switching mode LCD device.

First, the pixel electrode occupies space within the pixel region and so, an aperture ratio is reduced by an area occupied by the pixel electrode.

The pixel electrode connected with the drain electrode can be formed as the transparent electrode for solving the problem of a decrease in the aperture ratio. However, if etching selectivity between the transparent electrode and the drain electrode is not considered, the drain electrode may be etched during patterning of the transparent electrode. Therefore, reliability of the device may be degraded.

Furthermore, if the drain electrode material is selected taking into consideration the etching selectivity ratio between the transparent electrode and the drain electrode, chromium is the most appropriate material for the drain electrode.

But, since chromium has low electricity conductivity, and especially affects resolution, there are limitations in implementing the in-plane switching mode LCD device having high resolution and a large size.

SUMMARY OF THE INVENTION

Accordingly, the present invention is directed to an in-plane switching mode LCD device and a method for manufacturing the same which substantially obviates one or more problems due to limitations and disadvantages of the related art.

An advantage of the present invention is to provide an in-plane switching mode LCD device and a method for manufacturing the same that are applicable to an LCD device having high resolution and a large size by improving brightness and aperture ratio without an additional mask.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, the in-plane switching mode liquid crystal display device comprises a thin film transistor within a pixel region defined by a plurality of gate lines and data lines; and buffer layer is interposed between a gate electrode and source and drain electrodes of the thin film transistor. The active region includes a gate electrode on an insulating substrate; a gate insulating film on an entire surface of the insulating substrate including the gate electrode; a semiconductor layer and an ohmic contact layer on the gate insulating film; a buffer layer on the ohmic contact layer to cover the semiconductor layer and the ohmic contact layer; source and drain electrodes on the buffer layer; a transparent conductive film for a pixel electrode connected with the drain electrode; a passivation film on the pixel electrode; and a common electrode on the passivation film.

In another aspect of the present invention, a method for manufacturing the in-plane switching mode LCD device includes selectively depositing a buffer layer on the insulating substrate deposited on the gate electrode, the gate insulating film, the semiconductor layer, and the ohmic contact layer; patterning the buffer layer; forming the transparent conductive film for the pixel electrode through the gate insulating film and the buffer layer; and forming the source and drain electrodes to connect with the transparent conductive film for the pixel electrode.

In the in-plane switching mode LCD device according to the present invention, the buffer layer is formed on the ohmic contact layer, so that the etching selectivity between the drain electrode and the transparent conductive film is improved and it is possible to prevent the drain electrode from chemically reacting with the ohmic contact layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to an embodiment of the present invention, examples of which are illustrated in the accompanying drawings.

Since a plan structure of an LCD device according to the present invention is the same as a structure of a related art LCD device, the plan structure of the LCD device according to the present invention will be described with reference to the related art plan view.

Figure 1A:
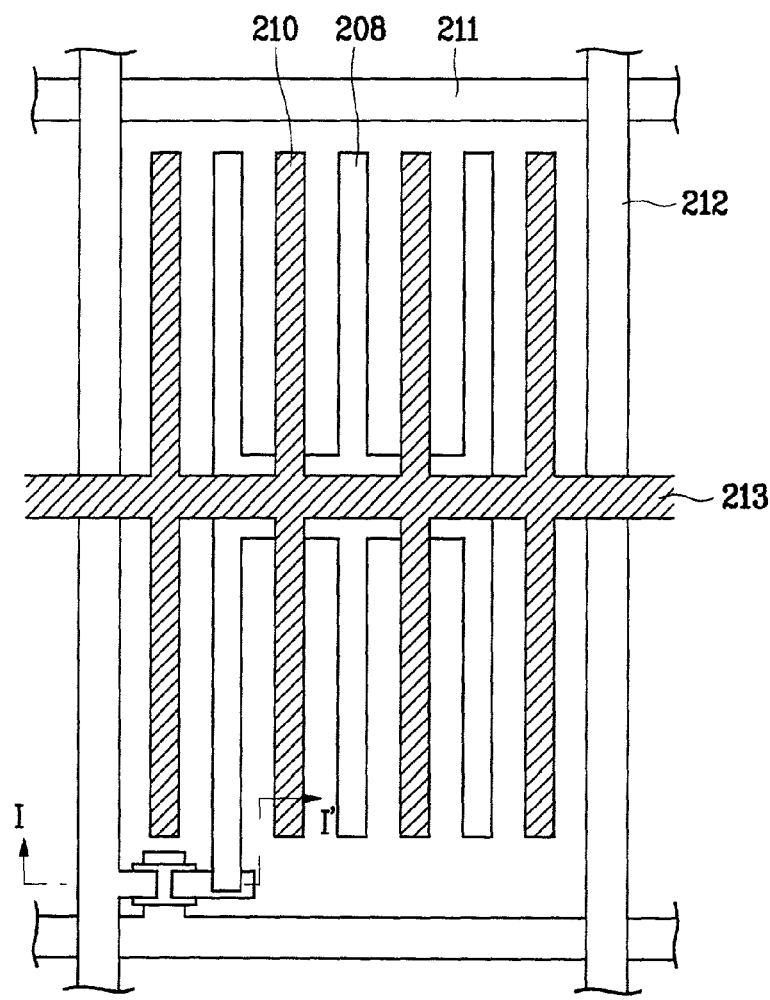
FIG. 1A is a plan view illustrating a structure of a related art in-plane switching mode LCD device.
Figure 1B:
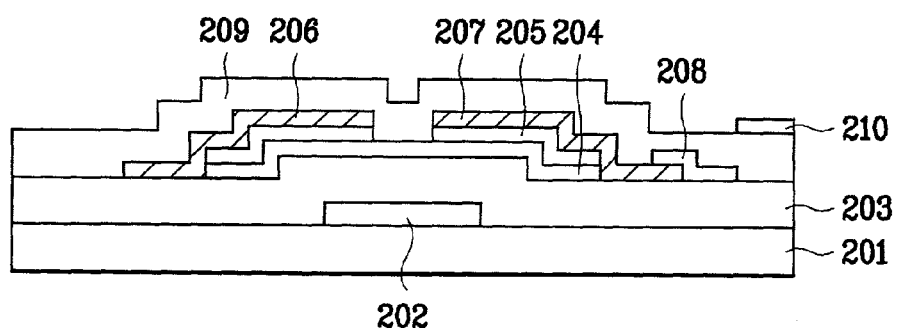
FIG. 1B is a plan view taken along line I–I' of FIG. 1A.
Figure 2A:
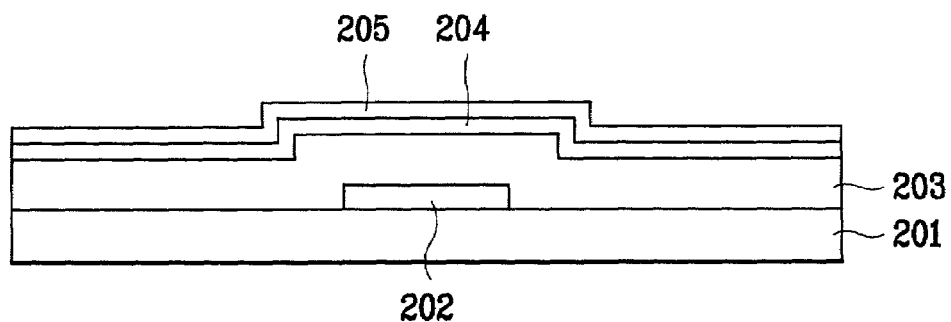
FIG. 2A to FIG. 2E are sectional views illustrating manufacturing process steps in accordance with the related art in-plane switching mode LCD device.
Figure 2B:
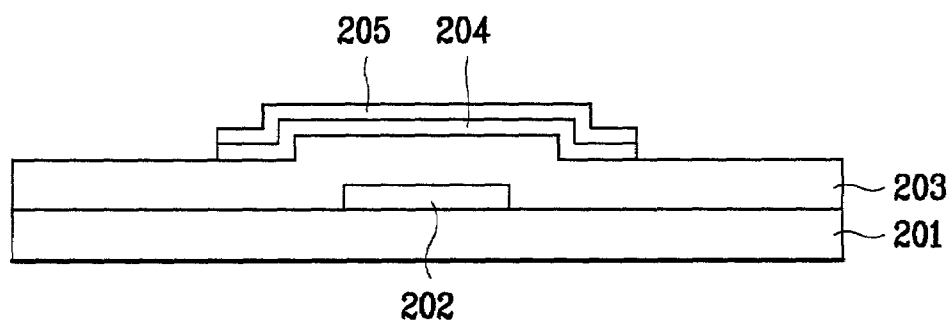
Figure 2C:
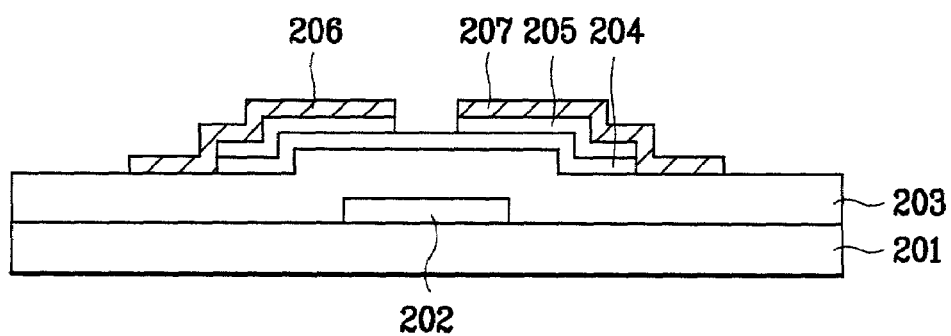
Figure 2D:
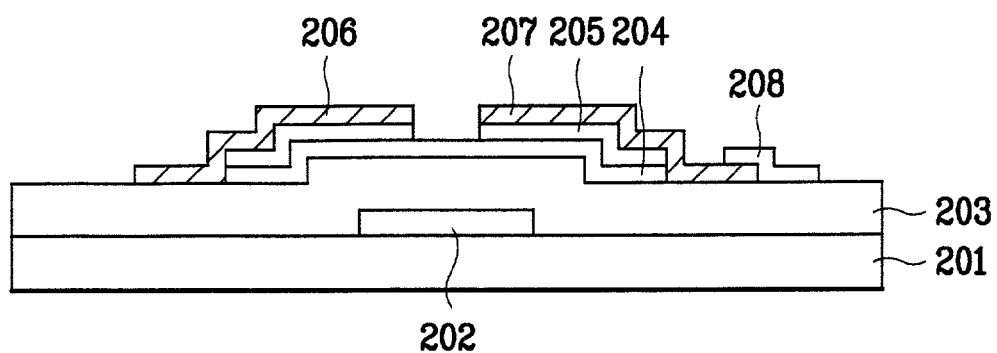
Figure 2E:
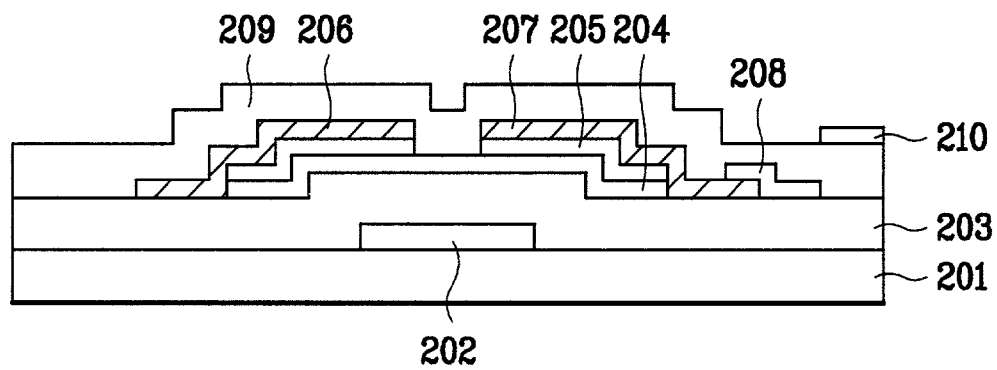
Figure 3:
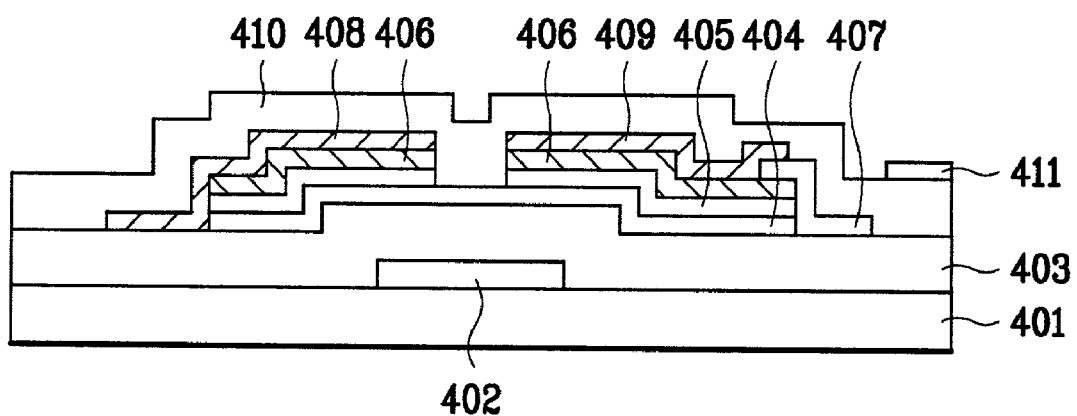
FIG. 3 is a sectional view illustrating a structure of an in-plane switching mode LCD device in accordance with the present invention.

FIG. 3 is a sectional view illustrating a structure of an in-plane switching mode LCD device in accordance with the present invention, taken along line I–I' of FIG. 1A. As shown in FIG. 3, the in-plane switching mode LCD device according to the present invention includes an insulating substrate 401; a gate electrode 402 formed on the insulating substrate 401; a gate insulating film 403 formed on the insulating substrate 401 including the gate electrode 402; a semiconductor layer 404, an ohmic contact layer 405 and a buffer layer 406 deposited on the gate insulating film 403 at an upper portion of the gate electrode 402; a transparent pixel electrode 407 connected with the buffer layer 406; source electrode 408 and drain electrode 409 formed on the buffer layer 406; a passivation layer 410 formed on an entire surface of the insulating substrate 401 including the source electrode 408 and drain electrode 409; and a common electrode 411 formed on the passivation layer 410.

The gate electrode 402 is formed of a low resistance metal such as aluminum (Al), copper (Cu), and silver (Ag).

The gate insulating film 403 is formed of a silicon nitride film ($SiN_x$), or a silicon oxide film ($SiO_x$) and the buffer layer 406 is generally formed of metal such as titanium (Ti).

As the buffer layer is formed, it is possible to prevent low resistance metals used as the source and drain electrodes from chemically reacting with the ohmic contact layer, and an etching selectivity between the source and drain electrodes and the transparent pixel electrode is improved.

The manufacturing process steps of the in-plane switching mode LCD device will be described in more detail with reference to FIG. 4A to FIG. 4E.

Figure 4A:
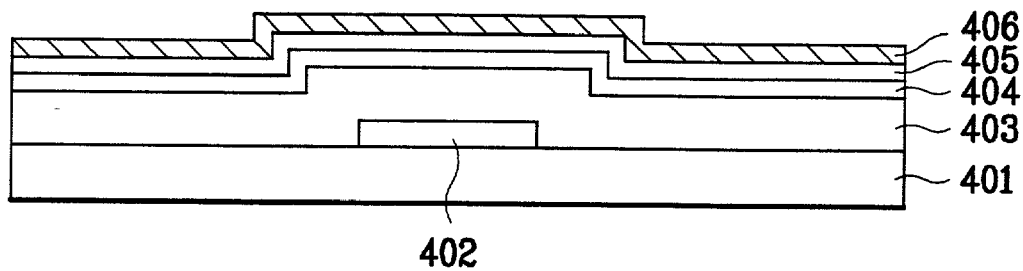
FIG. 4A to FIG. 4E are sectional views illustrating manufacturing process steps of the in-plane switching mode LCD device in accordance with the present invention.

As shown in FIG. 4A, one of the low resistance metals such as aluminum (Al), copper (Cu), and silver (Ag) is deposited on the insulating substrate 401 by a sputtering process, and then the gate electrode 402 is formed by a patterning process using photolithography. The gate insulating film 403 comprising a silicon nitride film or a silicon oxide film is formed on the insulating substrate 401 including the gate electrode 402. The semiconductor layer 404, the ohmic contact layer 405, and the buffer layer 406 of titanium are formed on the gate insulating film 403 by a PECVD process. At this time, the presence of the buffer layer 406 makes it possible to prevent the ohmic contact layer from chemically reacting with a drain electrode, which will be formed.

Figure 4B:
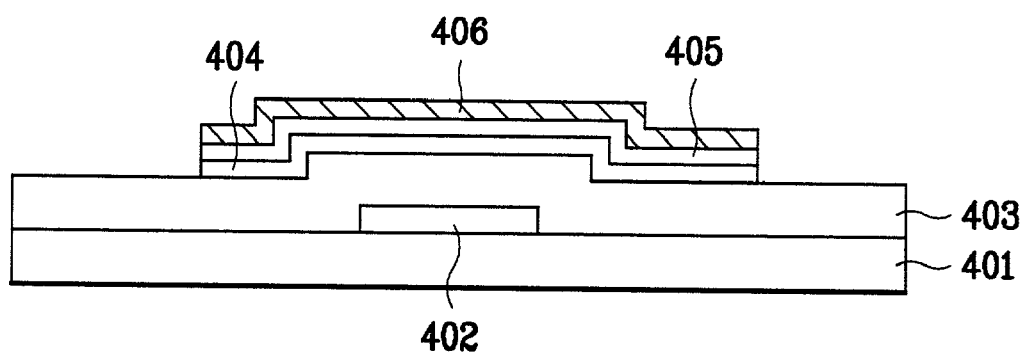
Figure 4C:
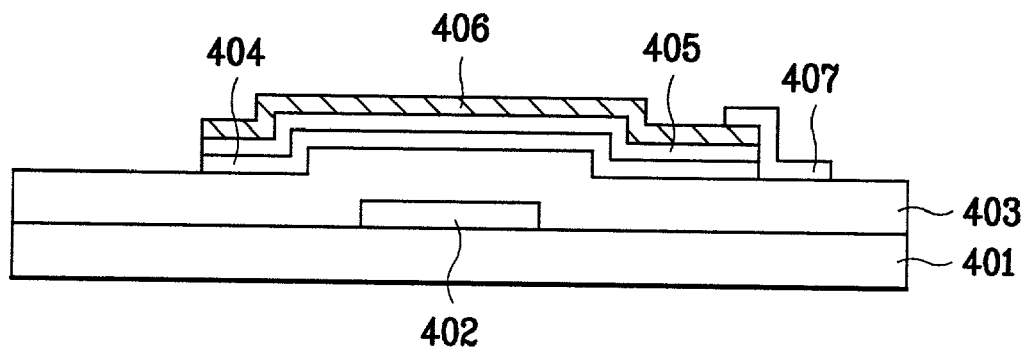

As shown in FIG. 4B, the semiconductor layer 404, the ohmic contact layer 405 and the buffer layer 406 of titanium, which are formed on the gate insulating film 403, are patterned. Then, as shown in FIG. 4C, the transparent conductive film for the pixel electrode, such as ITO, is formed on the buffer layer 406 by a sputtering process, and is patterned so that a transparent electrode 407 is formed.

Figure 4D:
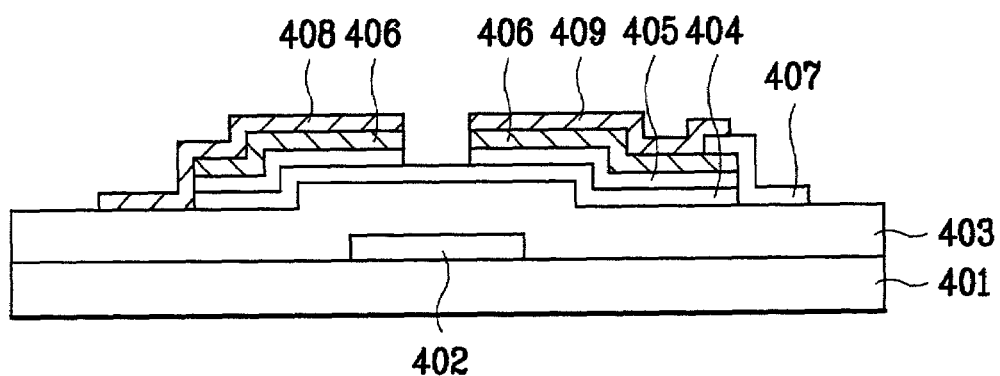

As shown in FIG. 4D, the source and drain electrodes 408 and 409 are formed of one of aforementioned low resistance metals to connect with the transparent electrode 407 for the pixel electrode on the buffer layer 406.

Figure 4E:
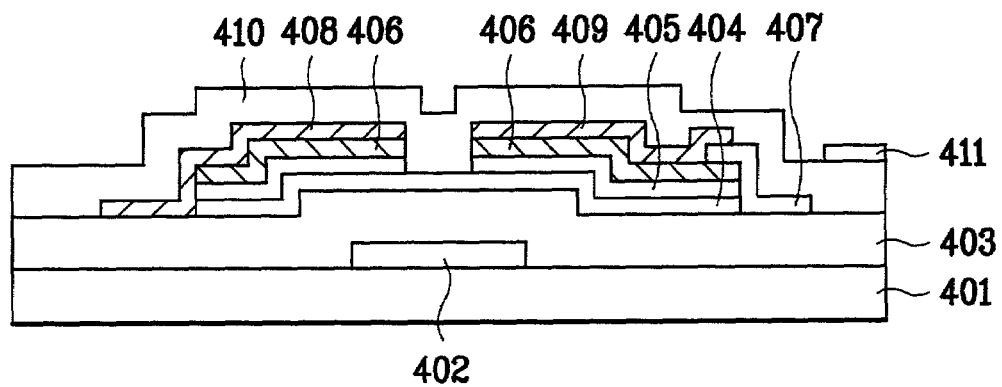

As shown in FIG. 4E, the passivation layer 410 is deposited on the entire surface of the insulating substrate 401 including the source and drain electrodes 408 and 409, and then the common electrode 411 is formed on the passivation layer 410.

Afterwards, a liquid crystal layer is formed between the insulating substrate 401 and an opposing substrate provided with a color-filter and a black matrix (not shown), so that the manufacturing process steps of the in-plane switching mode LCD device according to the present invention are completed.

As has been explained, the in-plane switching mode LCD device and the method for manufacturing the same according to the present invention have the following advantages.

In the in-plane switching mode LCD device according to the present invention, brightness and aperture ratio can be improved without an additional mask. Also, the buffer layer comprising titanium (Ti) is deposited on the ohmic contact layer, so that the etching selectivity between the source and drain electrodes and the transparent conductive film is improved, and the buffer layer makes it possible to prevent a chemical reaction between the source and drain electrodes and the ohmic contact layer. Accordingly, the low resistance materials such as aluminum (Al), copper (Cu) and silver (Ag), can be used as the source and drain electrodes, so that the in-plane switching mode LCD device is applicable to the LCD device having fineness and a large size.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display (LCD) device comprising:
   a gate electrode on a substrate;
   a gate insulating film on an entire surface of the substrate;
   a semiconductor layer and an ohmic contact layer on the gate insulating film;
   a buffer layer on the ohmic contact layer;
   a pixel electrode on the buffer layer;
   source or drain electrodes on the pixel electrode, the source or drain electrodes being connected with a portion of the pixel electrode on the buffer layer, wherein the connection is at an overlap of the source or drain electrodes and an end portion of the buffer layer;
   a passivation layer on the entire surface of the substrate including the pixel electrode; and
   a common electrode on the passivation layer substantially parallel to the pixel electrode.

2. The in-plane switching mode LCD device as claimed in claim 1, wherein the gate electrode includes a low resistance material.

3. The in-plane switching mode LCD device as claimed in claim 2, wherein the low resistance material includes one of aluminum (Al), copper (Cu), and silver (Ag).

4. The in-plane switching mode LCD device as claimed in claim 1, wherein the buffer layer includes a metal.

5. The in-plane switching mode LCD device as claimed in claim 4, wherein the buffer layer includes titanium (Ti).

6. The in-plane switching mode LCD device as claimed in claim 1, wherein the source and drain electrodes include a low resistance material.

7. The in-plane switching mode LCD device as claimed in claim 6, wherein the low resistance material includes one of aluminum (Al), copper (Cu), and silver (Ag).

8. The in-plane switching mode LCD device as claimed in claim 1, wherein the pixel electrode includes transparent conductive material.

9. The in-plane switching mode LCD device as claimed in claim 8, wherein the pixel electrode includes indium tin oxide.

10. The in-plane switching mode LCD device as claimed in claim 1, wherein the common electrode includes indium tin oxide.

11. A method for manufacturing an in-plane switching mode liquid crystal display (LCD) device comprising:
    forming a gate electrode on a substrate;
    forming a gate insulating film, a semiconductor layer, an ohmic contact layer, and a buffer layer on the gate electrode;
    forming a pixel electrode on the buffer layer;
    forming a source electrode or a drain electrode on a portion of the pixel electrode on the buffer layer, the source or drain electrodes being connected with the pixel electrode at an overlap of the source or drain electrodes and an end portion of the buffer layer;
    forming a passivation layer on the entire surface of the substrate including the pixel electrode; and
    forming a common electrode on the passivation layer substantially parallel to the pixel electrode.

12. The method for manufacturing an in-plane switching mode LCD device as claimed in claim 11, wherein the gate electrode includes one of aluminum (Al), copper (Cu), and silver (Ag).

13. The method for manufacturing an in-plane switching mode LCD device as claimed in claim 11, wherein the buffer layer includes titanium (Ti).

14. The method for manufacturing an in-plane switching mode LCD device as claimed in claim 11, wherein the source and drain electrodes include one of aluminum (Al), copper (Cu), and silver (Ag).

15. The method for manufacturing an in-plane switching mode LCD device as claimed in claim 11, wherein the pixel electrode includes indium tin oxide.

16. The method for manufacturing an in-plane switching mode LCD device as claimed in claim 11, wherein the drain electrode is electrically connected with the pixel electrode.

17. The method for manufacturing an in-plane switching mode LCD device as claimed in claim 11, wherein the common electrode includes indium tin oxide.

18. The method for manufacturing an in-plane switching mode LCD device as claimed in claim 11, wherein the gate electrode is deposited by a sputtering process.

19. The method for manufacturing an in-plane switching mode LCD device as claimed in claim 18, wherein the gate electrode is patterned using photolithography.

20. The method for manufacturing an in-plane switching mode LCD device as claimed in claim 11, wherein the semiconductor layer, the ohmic contact layer, and the buffer layer are formed on the gate insulating film by a plasma enhanced chemical vapor deposition (PECVD) process.

21. The method for manufacturing an in-plane switching mode LCD device as claimed in claim 20, wherein the semiconductor layer, the ohmic contact layer, and the buffer layer are patterned.

22. The method for manufacturing an in-plane switching mode LCD device as claimed in claim 9, wherein the pixel electrode is formed by a sputtering process.

23. The method for manufacturing an in-plane switching mode LCD device as claimed in claim 22, wherein the pixel electrode is patterned.

24. The method for manufacturing an in-plane switching mode LCD device as claimed in claim 9, wherein the passivation layer is formed by a deposition process.

* * * * *